(12) United States Patent
Fukuda et al.

(10) Patent No.: US 8,762,137 B2
(45) Date of Patent: Jun. 24, 2014

(54) TARGET VOICE EXTRACTION METHOD, APPARATUS AND PROGRAM PRODUCT

(75) Inventors: Takashi Fukuda, Yokohama (JP); Osamu Ichikawa, Yokohama (JP); Masafumi Nishimura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 12/955,882

(22) Filed: Nov. 29, 2010

(65) Prior Publication Data

US 2011/0131044 A1 Jun. 2, 2011

(30) Foreign Application Priority Data

Nov. 30, 2009 (JP) ................................. 2009-271890

(51) Int. Cl.
*G10L 21/00* (2013.01)
(52) U.S. Cl.
USPC ........................................................ 704/225
(58) Field of Classification Search
USPC ................................................. 704/200–278
See application file for complete search history.

(56) References Cited

U.S. PATENT DOCUMENTS

| 6,618,073 | B1 * | 9/2003 | Lambert et al. ............ 348/14.08 |
| 8,566,084 | B2 * | 10/2013 | Ichikawa et al. .............. 704/211 |
| 2007/0005350 | A1 * | 1/2007 | Amada ........................ 704/211 |

FOREIGN PATENT DOCUMENTS

JP 2008-275881 11/2008

OTHER PUBLICATIONS

Chen et al.; A Pseudo adaptive microphone array; Acoustics, Speech, and Signal Processing, 2003, Proceedings. (ICASSP '03). Publication Year:2003. pp. II-469-II-472 vol. 2.*

Denda, Y et al.; Adesign of audio-visual talker traking system based on CSP analysis and frame difference in real noisy enviornments; Multimedia Signal Processing, 2004 IEEE 6$^{th}$ Workshop on. Publication Year: 2004, pp. 63-66.*

Shen, M et al.; A Modified cross power-spectrum phase method based on microphone array for acoustic source localization; Systems, Man and Cybernetics, 2009, SMC 2009, IEEE International Conference on. Publication Year: 2009. pp. 1286-1291.*

Denda et al., "Robust Talker Direction Estimation Based on Weighted CSP Analysis and Maximum Likelihood Estimation," IEICE Transactions on Information Systems, Mar. 2006, E89-D, 3, pp. 1050-1057.

Araki et al., "A Novel Blind Source Separation Method with Observation Vector Clustering," IWAENC2005, 2005, pp. 117-120.

* cited by examiner

Primary Examiner — Abul Azad
(74) Attorney, Agent, or Firm — Vazken Alexanian

(57) ABSTRACT

An apparatus, program product and method is provided for separating a target voice from a plurality of other voices having different directions of arrival. The method comprises the steps of disposing a first and a second voice input device at a predetermined distance from one another and upon receipt of voice signals at said devices calculating discrete Fourier transforms for the signals and calculating a CSP (cross-power spectrum phase) coefficient by superpositioning multiple frequency-bin components based on correlation of the two spectra signals received and then calculating a weighted CSP coefficient from said two discrete Fourier-transformed speech signals. A target voice is separated when received by said devices from other voice signals in a spectrum by using the calculated weighted CSP coefficient.

19 Claims, 14 Drawing Sheets

(a)

(b)

(a)

(b)

TARGET VOICE EXTRACTION METHOD, APPARATUS AND PROGRAM PRODUCT

CROSS REFERENCES

This application takes priority from foreign filed application JP 2009-271890 filed Nov. 30, 2009. That application is incorporated by reference herein.

BACKGROUND OF THE INVENTION

1. Field of the Invention

This invention generally relates to a method, apparatus and related program product for selecting a target voice among multiple voices having different directions and more particularly relates to a technique of voice selection by using a CSP (cross-power spectrum phase) coefficient.

2. Description of Background

In recent years, fraud has become of major concern especially when used in a commercial environment. Substantial efforts are made to protect the consumer and maintain client's trust through providing secure settings and ensuring ethical transactions between the consumer client and the representatives of the entities. Accordingly, establishment of a so-called compliance structure has become an important and an urgent issue. As part of an effort to improve compliance, in some industries such as those providing financial services, for example, any conversation between a clerk representing the institution and a customer at the counter or other such commercial settings is recorded. This is to check through a number of methods (such as using indexing with automatic speech recognition) the clerk's manner of conducting business operations.

Various methods are used in collecting records of conversations such as between a clerk and a customer at the counter or other such business settings. One such method may involve recording of a conversation with a close-talking microphone that is disposed on or nearby the clerk. This method is aimed to record the voice of the clerk only, but ends up also recording the voice of the customer as well which makes at times makes many customers reluctant to do business in view of their conversation being recorded. Accordingly, many businesses are hesitant to use this technology as they do not feel that it is an appropriate manner of keeping customer satisfaction.

In another effort, the voice of a clerk can be collected with a uni-directional microphone disposed at a location undetectable to the customer. Unfortunately, even this method has its flaws as a standard microphone has low directivity and thus ends up recording the voice of a customer as well which may provide both legal and other issues of its own. Using a super-directive microphone, such as a gun microphone, is also not practical as it is cost prohibitive and large.

A different but related problem also exists that affect other settings. In certain situations, a voice from an unexpected source and direction causes problems and therefore needs to be efficiently removed. Such an instance may occur, for example, when using the automatic speech recognition while operating a car navigation system on a vehicle. In this situation, with the driver struggles to remain the target speaker, voices of one or more passengers in the car may interfere with the operation of the system and therefore has to be efficiently removed.

Prior art techniques perform gain control of the speech spectrum for the target speaker by using a CSP coefficient which is a cross-correlation between two channel signals. In other situations, a binary mask can be used based on a direction of voice arrival. The prior art takes advantage of the gain control of a speech spectrum of a target speaker by using a CSP coefficient takes advantage of a characteristic that a CSP coefficient in a designated direction takes a large value when the target speaker located in the designated direction is speaking, and takes a small value when the target speaker is not speaking. Unfortunately, the CSP coefficient when used in a designated direction sometimes takes a relatively large value especially when a speaker that is different from the target speaker is located in the general designated direction where the target speech is to originate. In such a case, the speech spectrum extracted by gain control using a CSP coefficient contains the voice of a speaker that may be different than that of the intended target speaker. This degrades the reliability and accuracy of the entire system (automatic speech recognition). This is a shortcoming of both the weighted CSP approach and the binary mask approach and others used currently by available prior art.

Consequently, it is desirable to introduce a solution that can overcome the problems not currently addressed by the prior art.

SUMMARY OF THE INVENTION

The shortcomings of the prior art are overcome and additional advantages are provided through the provision of an apparatus, program product and related method for separating a target voice from a plurality of other voices having different directions of arrival. The method comprises the steps of disposing a first and a second voice input device at a predetermined distance from one another and upon receipt of voice signals at said devices calculating discrete Fourier transforms for the signals and calculating a CSP (cross-power spectrum phase) coefficient by superpositioning multiple frequency-bin components based on correlation of the two spectra signals received and then calculating a weighted CSP coefficient from said two discrete Fourier-transformed speech signals. A target voice is separated when received by said devices from other voice signals in a spectrum by using the calculated weighted CSP coefficient.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
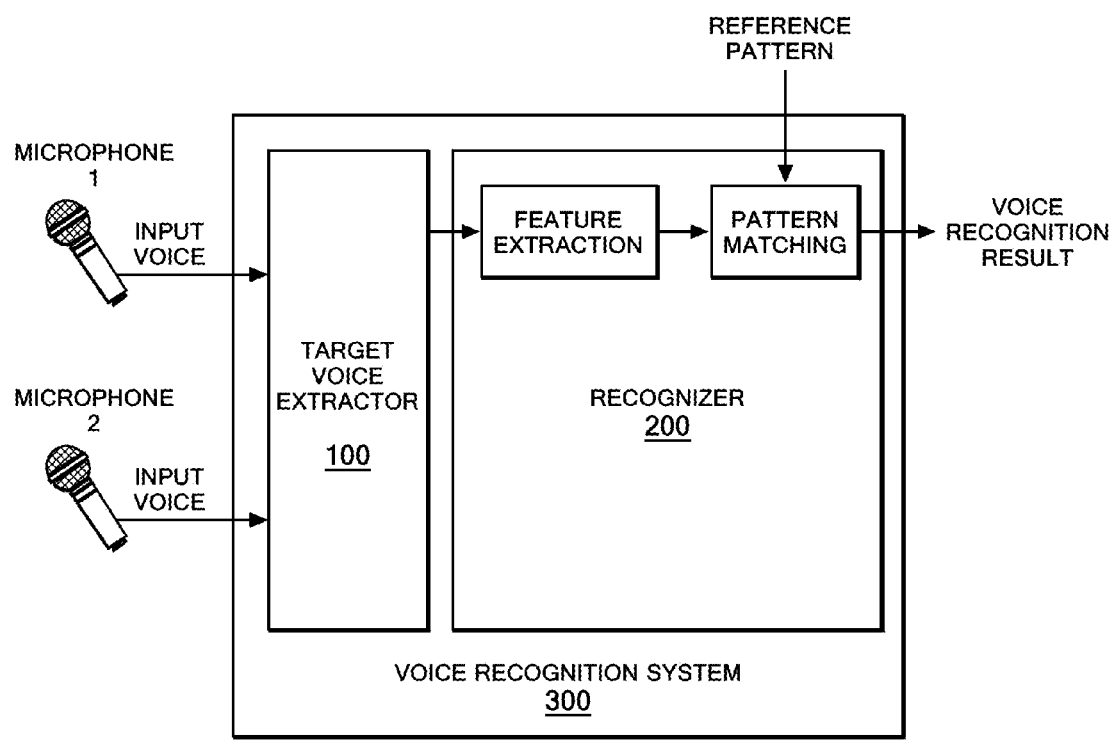
FIG. 1 is an illustration showing a configuration diagram for an automatic speech recognition system such as used in one embodiment of the present invention.

FIG. 1 is an illustration showing a configuration diagram for an automatic speech recognition system to which the present invention can be applied according to one embodiment. An automatic speech recognition system 300 is mainly comprised of a target voice extractor 100 configured to extract a target voice as preprocessing and a recognizer 200 configured to recognize a voice. The target voice extractor 100 and the recognizer 200 are connected to each other as shown in FIG. 1, as per one embodiment of the invention, in order to fulfill their appropriate designated functions. An input voice arriving from a microphone 1, for example, and an input voice arriving from a microphone 2 are each converted to frequency domains by using FFT (fast Fourier transform) and subjected to gain control and speech section clipping in the target voice extractor 100 by using a W-CSP coefficient. Subsequently, the processing result is inputted in the recognizer 200. The recognizer 200 extracts a feature amount for automatic speech recognition, performs pattern matching with a reference pattern, and finally outputs an automatic speech recognition result.

The configuration discussed in conjunction with FIG. 1 as well as a number of similar configurations as known to those skilled in the art can be applied and used by one embodiment. The target voice extractor 100 can be used to extract the target voice while preventing mixing of a different voice than that of the intended target voice. In an experimental analysis that is described later, the effects of such an arrangement as provided by one embodiment of the present invention are evaluated according to an automatic speech recognition result finally obtained through the recognizer 200. Note that there is more than one way of applying one or more of the embodiments of the present invention to the target voice extractor 100. Different functional configurations of the target voice extractor 100 in some of these application (i.e. ways) will be described below as applicable to different embodiment (first to fourth discussed). Of the present invention. As appreciated by those skilled in the art, other alternative embodiments and applications not discussed herein can be achievable. However, for ease of understanding and for preventing the current discussion to become exhaustive, each of those applications will not be addressed separately.

Figure 2:
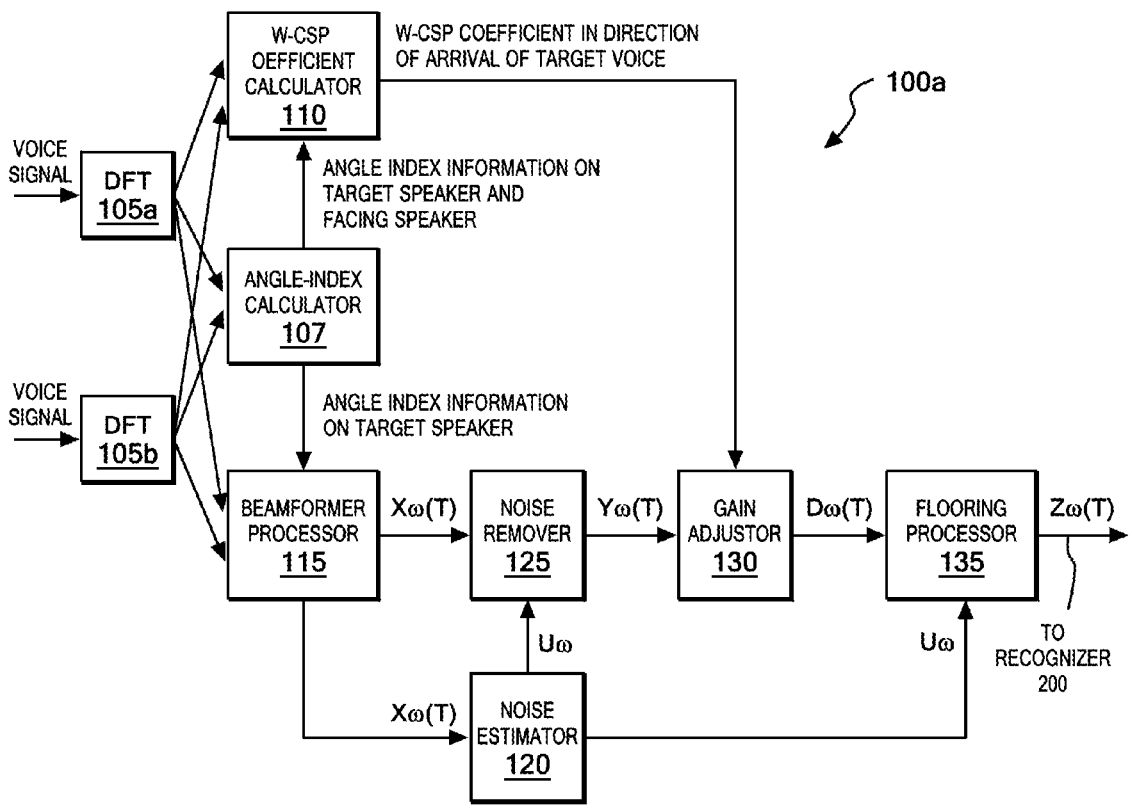
FIG. 2 is a functional illustration showing the configuration of a target voice extractor apparatus according to a first embodiment of the present invention.

FIG. 2 is an illustration of a first embodiment of the present invention. FIG. 2 shows a functional configuration of a target voice extractor 100a. The target voice extractor 100a comprises of discrete Fourier transformers (DFT) 105a and 105b, a directional-index calculator 107, a weighted CSP coefficient calculator 110, a beam-former processor 115, a noise estimator 120, a noise remover 125, a gain adjustor 130, and a flooring processor 135.

The discrete Fourier transformers 105a and 105b receive speech signals $S1(t)$ and $S2(t)$ from two respective voice input devices, the microphone 1 and the microphone 2, placed with a predetermined distanced there-between. Subsequently, each of the discrete Fourier transformers 105a and 105b appropriately amplifies the speech signal thus received, divides it into frames each having a predetermined time width, and performs a discrete Fourier transform on each frame by using FFT or the like. Finally, the discrete Fourier transformers 105a and 105b output frequency-domain signals $S1,T(\omega)$ and $S2,T(\omega)$, respectively.

In speech signals $S1(t)$ and $S2(t)$, "t" denotes a sampling number corresponding to time. The frequency-domain signals $S1,T(\omega)$ and $S2,T(\omega)$ are complex spectra, where T denotes a frame number corresponding to time, and $\omega$ denotes a frequency-bin number corresponding to frequency of the discrete Fourier transform. Note that the above-described processing performed by the discrete Fourier transformers 105a and 105b is a known technique in digital speech signal processing and is not the gist of the present invention; therefore, they are not described further here.

The directional-index calculator 107 receives the signals $S1,T(\omega)$ and $S2,T(\omega)$ outputted from the respective discrete Fourier transformers 105a and 105b, and calculates the position (sound source) of a target speaker whose voice is to be extracted and the position (sound source) of a speaker different from the target speaker (hereinafter referred to simply as a facing speaker), by using a sonic-wave DOA (direction of arrival) calculation method of the CSP approach. One such method for calculating the positions of the speakers is described in detail below. Other such methods also exist as appreciated by those skilled in the art.

A CSP coefficient $\phi 1T(i)$ is obtained from $S1,T(\omega)$ and $S2,T(\omega)$ by using the following formula.

$$\varphi 1_T(i) = IDFT\left[\frac{S_{1,T}(\omega)S_{2,T}(\omega)^*}{|S_{1,T}(\omega)||S_{2,T}(\omega)|}\right] \quad \text{[Formula 1]}$$

In this case, $\phi 1T(i)$ is a T-th frame CSP coefficient obtained by the complex spectra of the voices inputted from the microphones 1 and 2, and i is a direction of voice arrival (directional index). In addition, * denotes a complex conjugate number (the same applies to the formulae below).

Figure 6:
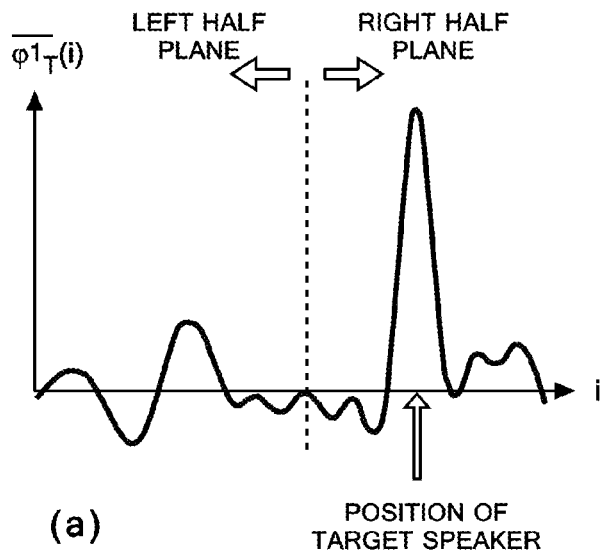
FIG. 6A a graphical illustration of a CSP coefficient and FIG. 6B illustrates an example of a directional voice arrival with respect to microphones.
Figure 6:
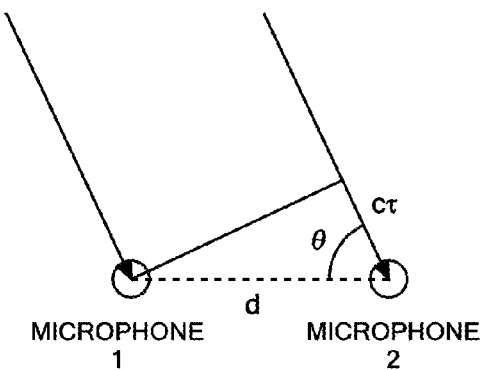

FIG. 6A is a schematic illustration of one example of a graph a T-th frame CSP coefficient. As can be seen in FIG. 6A, the value of the CSP coefficient is high for the direction of voice arrival. Accordingly, the CSP coefficient can be used to detect the positions of the target speaker and the facing speaker on a half-plane basis. A plane on which the microphones 1 and 2 are placed is divided into left and right half planes with a line perpendicular to a line connecting the microphones 1 and 2. In FIG. 6A, the left half plane is where the target speaker is not located, and the right half plane is where the target speaker is located.

A sample difference (phase difference) i is derived—that is, a difference in sampling unit, is then obtained using the CSP coefficient φ1T(i). At the location of the sample difference i, the CSP coefficient φ1T(i) is at its maximum value for the T-th frame when the target speaker spoke. The value thus obtained is denoted as x.

$$x = \mathrm{argmax}_i[\varphi 1_T(i)] \qquad \text{[Formula 2]}$$

Subsequently, x is divided by a sampling frequency Fs to obtain an arrival-time difference τ. Note that the arrival-time difference r has a relationship as shown in FIG. 6B among a sound speed c, the distance d between the microphones 1 and 2, and an angle θ between a directional vector from the microphone 1 to the microphone 2 and the direction of voice arrival. Accordingly, the angle θ between the direction of voice arrival of the target speaker and the directional vector from the microphone 1 to the microphone 2 can be obtained by the following formula.

$$\theta = \cos^{-1}\left(\frac{c \cdot x}{d \cdot F_S}\right) \qquad \text{[Formula 3]}$$

The angle θ between direction of voice arrival of the facing speaker and the directional vector from the microphone 1 to the microphone 2 can be obtained similarly. Note that, if the speakers are likely to move a little, the positions of the speakers may be traced chronologically using DP matching or the like. If the speakers are unlikely to move, on the other hand, previous positions of speech may be simply stored in the storage of a computer.

The weighted CSP coefficient calculator 110 receives the signals S1,T(ω) and S2,T(ω) outputted from the respective discrete Fourier transformers 105a and 105b, and calculates, based on those signals S1,T(ω) and S2,T(ω), a weighted CSP coefficient φ2T(i) by the following formula using a weight coefficient W(ω). For stable representation, a weighted CSP coefficient φ2T(i) bar is preferably obtained by taking a moving average over several frames before and after the T-th frame.

[Formula 4]

$$\varphi 2_T(i) = IDFT\left[W(\omega) \cdot \frac{S_{1,T}(\omega)S_{2,T}(\omega)^*}{|S_{1,T}(\omega)||S_{2,T}(\omega)|}\right]$$

$$\overline{\varphi 2_T(i)} = \frac{1}{(2M+1)} \sum_{m=-M}^{M} \varphi 2_{T+m}(i)$$

In this case, with a weighted CSP coefficient being regarded as superposition of multiple mutually-different frequency-bin components, the weight coefficient W(ω) takes a smaller value for the frequency bin of a component affected by speech of the facing speaker than a value for the frequency bins of other components. Using such weight coefficient W(ω) prevents the weighted CSP coefficient at the position of the target speaker from being increased by the speech of the facing speaker. As a result, unlike a conventional technique that uses a CSP coefficient for gain control, speech of the facing speaker does not cause an extracted speech spectrum to have a voice of a speaker different from the target speaker.

Figure 7:
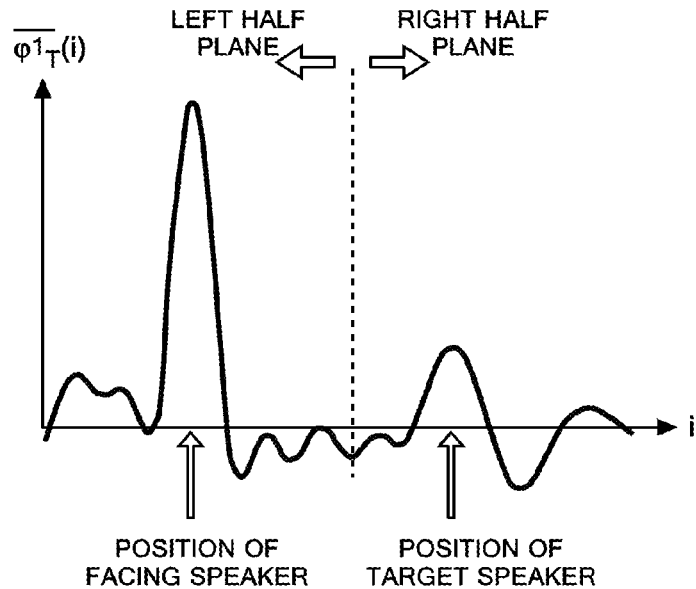
FIG. 7A is a graphical illustration of a CSP coefficient as affected by the voice of a target speaker.
FIG. 7B is an illustration showing a CSP coefficient for components having different frequency bins.
Figure 7:
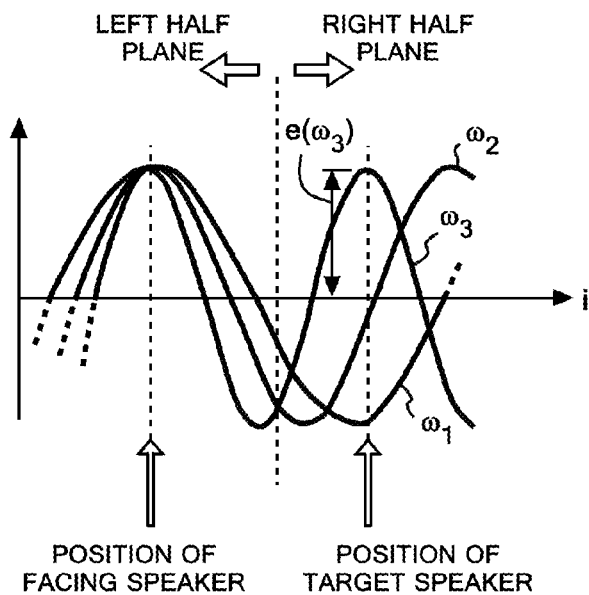

Referring to FIGS. 7A and 7B, the manner for obtaining a frequency band likely to be affected by speech of a facing speaker is described in detail. FIG. 7A is a schematic diagram showing an example of a graph for a CSP coefficient for a T'-th frame in which only the facing speaker is speaking and the target speaker is not speaking.

FIG. 7A shows an example of a case where the CSP coefficient at the position of the target speaker sometimes takes a relatively large value even though the target speaker is not speaking.

The cause of such phenomenon as discussed in conjunction with FIG. 7A can be appreciated by the following discussion. Specifically, as shown in Formula I, the CSP coefficient is obtained by performing an inverse discrete Fourier transform on a normalized cross-correlation function for each of frequency bins of a complex spectrum. In other words, a CSP coefficient finally obtained can be regarded as superposition of multiple mutually-different frequency-bin components. FIG. 7B shows an example of a CSP coefficient for components having frequency bins of ω1, ω2, and ω3 (ω1<ω2<ω3). Since only the facing speaker is speaking, every frequency-bin component takes a large, positive value at the position of the facing speaker. Meanwhile, at the position of the target speaker who is not speaking here, the frequency-bin components are usually supposed to take various values such as a positive value and a negative value and to finally sum up to zero or to a value close to zero.

However, when that balance is lost for some reason, a certain frequency-bin component surpasses other frequency-bin components, and consequently, the total of frequency-bin components at the position of the target speaker takes a relatively large positive value, like the component shown in FIG. 7B having a frequency bin of ω3. This is why speech of the facing speaker has been picked up. Accordingly, to avoid this problem, on the presumption that the positions of the facing speaker and the target speaker are known, a certain frequency bin is obtained, in which when the facing speaker speaks, a value e(ω) of that component takes a positive value at the position of the target speaker (in the example in FIG. 7B, the certain frequency bin is ω3 since e(ω3) is positive). Then, the weight coefficient W(ω) for that frequency bin is reduced. This can be expressed as formula below, for example.

$$W(\omega)=0.0 \text{ if } e(\omega)<0$$

$$W(\omega)=1.0 \text{ otherwise} \qquad \text{[Formula 5]}$$

In this case, e(ω) is a value that any selected frequency-bin component of speech by the facing speaker takes at the position of the target speaker, and is expressed as follows.

$$e(\omega) = \cos\left(\frac{2\pi\omega(i1 - i2)}{N}\right) \qquad \text{[Formula 6]}$$

In the above formula (6), N indicates the width (the number of sample points) of a discrete Fourier transform, ω indicates a frequency-bin number, and i1 and i2 indicate the positions of the target speaker and the facing speaker, respectively. Note that the weighted CSP coefficient calculator 110 acquires i1 and i2 from the directional-index calculator 107.

Among multiple mutually-different frequency-bin components, a frequency bin of a component affected by the speech of the facing speaker is one that takes a positive value in both of the direction of voice arrival of the target speaker and the direction of voice arrival of the facing speaker. Note that, in Formula 5, a simple weighting method is employed, and the weight for a frequency bin in which e(ω) takes a positive value is set to zero. If e(ω) is set to complete zero, however, information on that part is lost. For this reason, weighting by the following formula may be employed in one embodiment of the present invention.

$$W(\omega)=\min[1.0, 1.0-e(\omega)] \text{ if } e(\omega)>0$$

$$W(\omega)=1.0 \text{ otherwise} \quad \text{[Formula 7]}$$

The beam former processor 115 receives the signals S1,T(ω) and S2,T(ω) outputted from the respective discrete Fourier transformers 105a and 105b, performs beam former processing on those signals S1,T(ω) and S2,T(ω), and outputs a power spectrum Xω(T). For the beam former processing, a delay-and-sum array beam former or an adaptive beam former (least fraction beam former) may be employed.

The delay-and-sum array beam former receives a signal arriving from a θ direction with at least two microphones, and emphasizes the signal arriving from the θ direction by bringing the sounds caught by the respective microphones in phase and adding them together. Accordingly, signals arriving from a direction different from the θ direction are not brought in phase and are therefore not emphasized. This can form directivity which is sensitive for the θ direction and insensitive for other directions. Here, the direction of arrival of a voice of the target speaker is used as the θ direction, and the beam former processor 115 acquires the i1 information from the directional-index calculator 107.

The adaptive beam former can form a dead zone for a direction of noise and echo. Instead, other beam former processing may be employed. Further, the beam former processing may be omitted, or in other words, the signals S1,T(ω) and S2,T(ω) outputted from the respective discrete Fourier transformers 105a and 105b may pass the beam former processor 115, and one of them may be used as-is.

The noise estimator 120 receives the power spectrum Xω(T), and estimates a power spectrum Uω in a noise section, namely, in a section where the target speaker is not speaking. The estimation may employ a conventional technique that uses a section with low voice power. The power spectrum Uω of noise may be estimated in advance and be used as a fixed value, may be estimated (updated) sequentially at the same time as when a speech signal is inputted, or may be estimated (updated) at certain intervals. It is to be noted that the power spectrum Uω of noise does not include a voice of the facing speaker.

The noise remover 125 receives the power spectrum Xω(T) outputted from the beam former processor 115, performs processing for removing stationary noise by using the power spectrum Uω of noise estimated by the noise estimator 120, and outputs a power spectrum Yω(T). For the removal processing, spectrum subtraction or a Wiener filter or other such methods as appreciated by those skilled in the art may be utilized.

If the spectrum subtraction is used for the removal processing, the power spectrum Yω(T) obtained thereby is expressed as the following formula.

$$Y_\omega(T)=X_\omega(T)-\alpha U_\omega \quad \text{[Formula 8]}$$

In this case, α is any subtraction constant for which a value close to 1 is often selected. However, α may take any value. Note that the removal processing may be omitted, or in other words, the power spectrum Xω(T) outputted from the beam former processor 115 may pass the noise remover 125, and be used directly as the power spectrum Yω(T).

Using the weighted CSP coefficient acquired from the weighted CSP coefficient calculator 110, the gain adjustor 130 performs gain control on the power spectrum Yω(T) which is based on at least one of the signals S1,T(ω) and S2,T(ω) outputted from the respective discrete Fourier transformers 105a and 105b. To be more specific, the gain adjustor 130 performs control for exclusively outputting a voice of the target speaker by multiplying the power spectrum Yω(T) received from the noise remover 125 by the weighted CSP coefficient, and outputs the result as a power spectrum Dω(T). Note that the weighted CSP coefficient calculator 110 acquires the i1 information from the directional-index calculator 107, and gives the gain adjustor 130 a weighted CSP coefficient φ2T(i1) or its moving average for the direction of arrival of a voice of the target speaker.

The power spectrum Dω(T) outputted from the gain adjustor 130 is shown in the following formula.

$$D_\omega(T)=\overline{\phi 2_T(i1)} \cdot Y_\omega(T) \quad \text{[Formula 9]}$$

As described earlier, the weighted CSP coefficient newly employed by the present invention uses a weight coefficient that takes a small value for a frequency band likely to be affected by speech of the facing speaker. For this reason, a value for when the target speaker is not speaking is reliably reduced compared to a conventional CSP coefficient, and this processing securely reduces power spectra of speech signals arriving from a direction different from the direction of voice arrival of the target speaker.

The flooring processor 135 receives the power spectrum Dω(T) outputted from the gain adjustor 130, performs flooring processing on the power spectrum Dω(T), and outputs the result as a power spectrum Zω(T). In the flooring processing, a small value included in real data is not used as-is and is replaced with a proper value.

The power spectrum Zω(T) obtained by the flooring processing is expressed by the following formula.

$$Z_\omega(T)=D_\omega(T) \text{ if } D_\omega(T)>\beta \cdot U_\omega$$

$$Z_\omega(T)=\beta \cdot U_\omega \text{ otherwise} \quad \text{[Formula 10]}$$

In the formula above (10), Uω denotes a power spectrum of noise, and β denotes a flooring coefficient. For the power spectrum of noise, the power spectrum used in Formula 8, an output of the noise estimator 120, or a power spectrum estimated by other methods may be appropriately used. The flooring coefficient may be any value such as, for example, a value close to zero (e.g., 0.1), which is favorable in the technical field to which the present invention pertains. The power spectrum Zω(T) obtained as described above is outputted to the recognizer 200 for automatic speech recognition.

Figure 3:
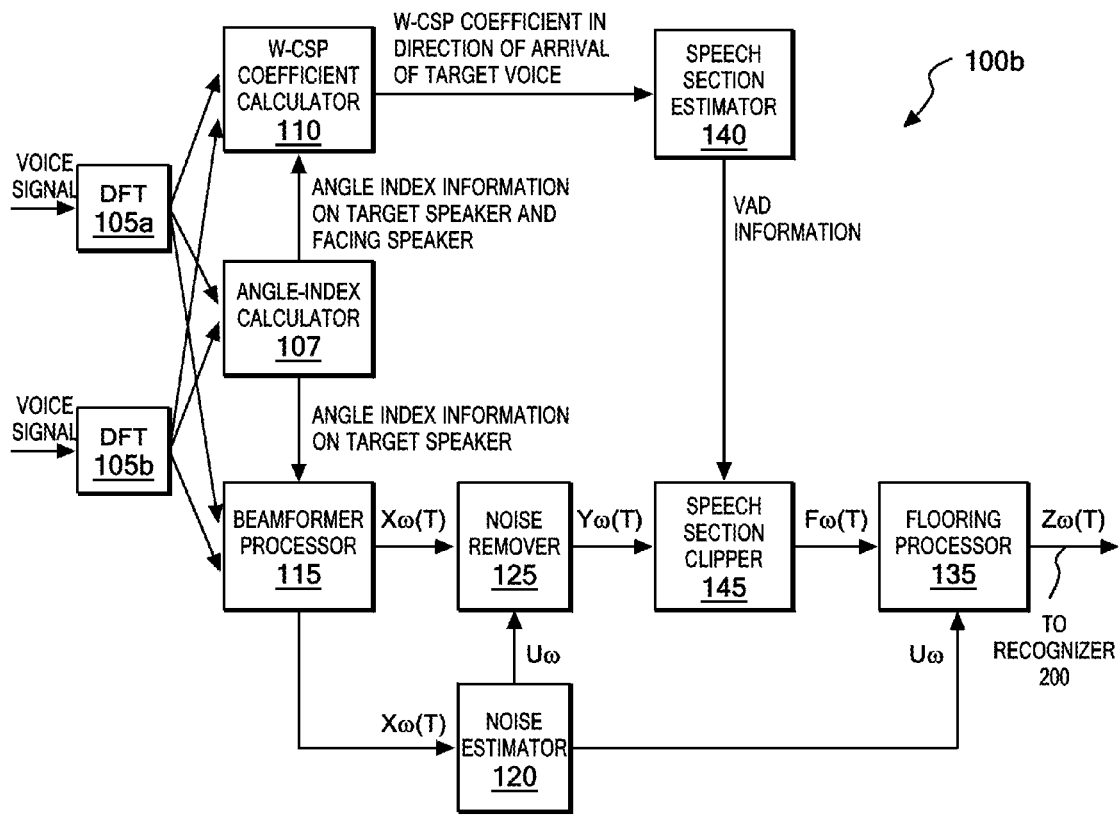
FIG. 3 is a functional illustration showing the configuration of a target voice extractor (apparatus) according to a second embodiment of the present invention.

FIG. 3 is an illustration of a second embodiment of the present invention. FIG. 3 as shown provides for a functional configuration depiction of a target voice extractor 100b according to this second embodiment. The target voice extractor 100b according this embodiment has the same substantial configuration as the target voice extractor 100a as discussed relating to the first embodiment of the present invention. In the case of this second embodiment, except for including a speech section estimator 140 and a speech section clipper 145 in place of the gain adjustor 130. Thus, the speech section estimator 140 and the speech section clipper 145 are described below.

The speech section estimator 140 receives the weighted CSP coefficient φ2T(i1) or its moving average for the direction of arrival of a voice of the target speaker from the weighted CSP coefficient calculator 110, and estimates a speech section in a target voice by using the weighted CSP coefficient φ2T(i1) or its moving average. Specifically, the speech section estimator 140 chronologically traces values of the weighted CSP coefficient or its moving average, and estimates a section in which the target speaker is believed to be speaking (VAD: Voice Activity Detection).

Figure 8:
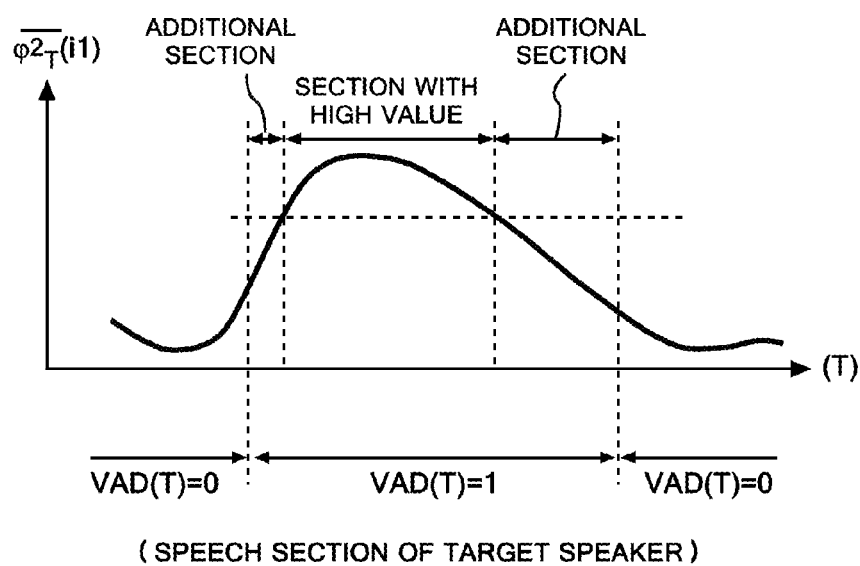
FIG. 8 is a graphical illustration showing a temporal change in a W-CSP coefficient in a direction of voice arrival of the target speaker.

FIG. 8 is an illustration showing a graphical example of a temporal change in the moving average of the weighted CSP coefficient for the direction of voice arrival of the target speaker. As FIG. 8 shows, the speech section estimator 140 detects a section in which the moving average of the weighted CSP coefficient is high, and estimates, as a speech section of the target speaker, a section obtained by adding sections of certain lengths to the head and end of the detected section. Then, a speech section function VAD(T) is defined by setting VAD(T)=1 for a speech section and VAD(T)=0 otherwise.

As described earlier, the weighted CSP coefficient newly employed by the present invention uses a weight coefficient that takes a small value for a frequency band likely to be affected by speech of the facing speaker. For this reason, the value while the target speaker is not speaking is reliably reduced compared to a conventional CSP coefficient, and therefore the speech section function VAD(T) indicates a speech section more accurately. Before the (flooring) processing, the speech section clipper 145 clips a speech section out of the power spectrum based on the speech section information VAD(T) acquired from the speech section estimator 140, the power spectrum being based on at least one of the signals $S1,T(\omega)$ and $S2,T(\omega)$ outputted from the respective discrete Fourier transformers 105a and 105b. The speech section clipper 145 outputs the result as a power spectrum $F\omega(T)$.

To be more specific, for a section with VAD(T)=1, the speech section clipper 145 outputs directly the power spectrum $Y\omega(T)$ received from the noise remover 125. On the other hand, for a section with VAD(T)=0, the speech section clipper 145 outputs a value obtained by multiplying the power spectrum $Y\omega(T)$ by an extremely small constant ε. This processing is expressed by the following formula.

$$F_\omega(T)=Y_\omega(T) \text{ if } VAD(T)=1$$

$$F_\omega(T)=\epsilon \cdot Y_\omega(T) \text{ otherwise} \qquad \text{[Formula 11]}$$

The speech section clipping processing in the present embodiment and the gain control processing in the first embodiment are both processing for exclusively outputting a voice of the target speaker, but have different characteristics. The speech section clipping processing in the present embodiment roughly estimates a speech section of the target speaker, and suppresses outputs for other sections. Accordingly, a voice of the facing speaker is picked up less in a section in which the target speaker is not speaking. The speech section clipping processing is suitable for a situation where the target speaker and the facing speaker speak alternately. However, the speech section clipping processing is not suitable for a situation where the target speaker and the facing speaker overlap in speech timing since no control is exerted within a speech section of the target speaker.

On the other hand, the gain control processing in the first embodiment shows a change which is acute in a temporal-axis direction, and therefore can prevent a phenomenon where the speech of the facing speaker gets an advantage in a short pause (a short non-speech section) during speech of the target speaker. Accordingly, the gain control processing can exert an effect even in a situation where the target speaker and the facing speaker overlap in speech timing. However, the gain control processing cannot completely prevent a voice of the facing speaker from being picked up in a non-speech section of the target speaker. For those reasons, both of the speech section clipping processing and the gain control processing may be used to take advantage of the characteristics of both of those processing and to compensate for each other's drawbacks. A target voice extractor 100c according to a third embodiment which employs such configuration is described below.

Figure 4:
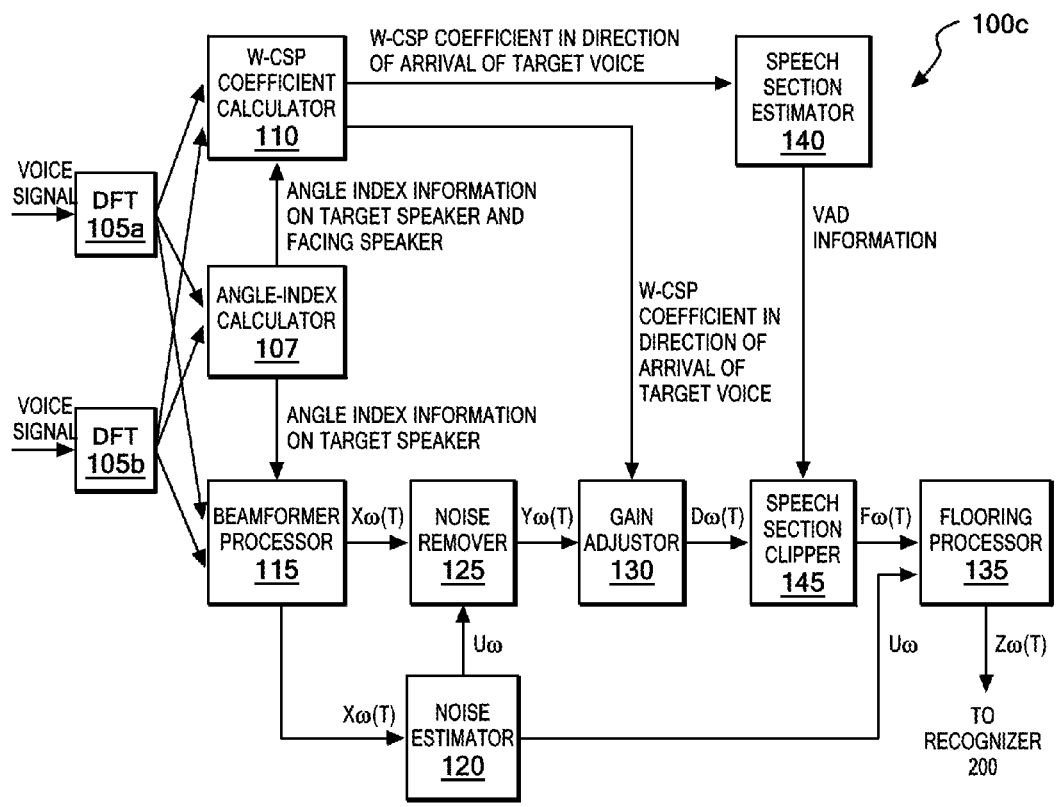
FIG. 4 is a functional illustration showing the configuration of a target voice extractor (apparatus) according to a third embodiment of the present invention.

FIG. 4 is an illustration of a third embodiment of the present invention. FIG. 4 shows a functional configuration of a target voice extractor 100c which is a combination of the target voice extractor 100a according to the first embodiment and the target voice extractor 100b according to the second embodiment as discussed above (includes constituents of both of the first and second embodiments.) More specifically, the target voice extractor 100c includes the gain adjustor 130 of the first embodiment and the speech section estimator 140 and the speech section clipper 145 of the second embodiment. Since each of those constituents has already been described, how they are connected is described here.

As can be seen in FIG. 4, the processing by the speech section estimator 140 is performed concurrently with the processing by the beamformer processor 115 to the processing by the gain adjustor 130. Then, the speech section clipping processing is performed after the gain control processing. The speech section clipper 145 receives the power spectrum $D\omega(T)$ from the gain adjustor 130, clips a speech section out of the power spectrum $D\omega(T)$ based on the speech section information VAD(T) acquired from the speech section estimator 140, and outputs the result as the power spectrum $F\omega(T)$. The power spectrum $F\omega(T)$ outputted from the speech section clipper 145 is inputted to the flooring processor 135.

As described, by performing both of the gain control processing and the speech section clipping processing, the target voice extractor 100c according to the third embodiment can extract a target voice while appropriately preventing mixing of a voice different from the target voice, that is, a voice of the facing speaker, in both of the situation where the target speaker and the facing speaker speak alternately speak and the situation where the target speaker and the facing speaker overlap in speech timing.

Figure 5:
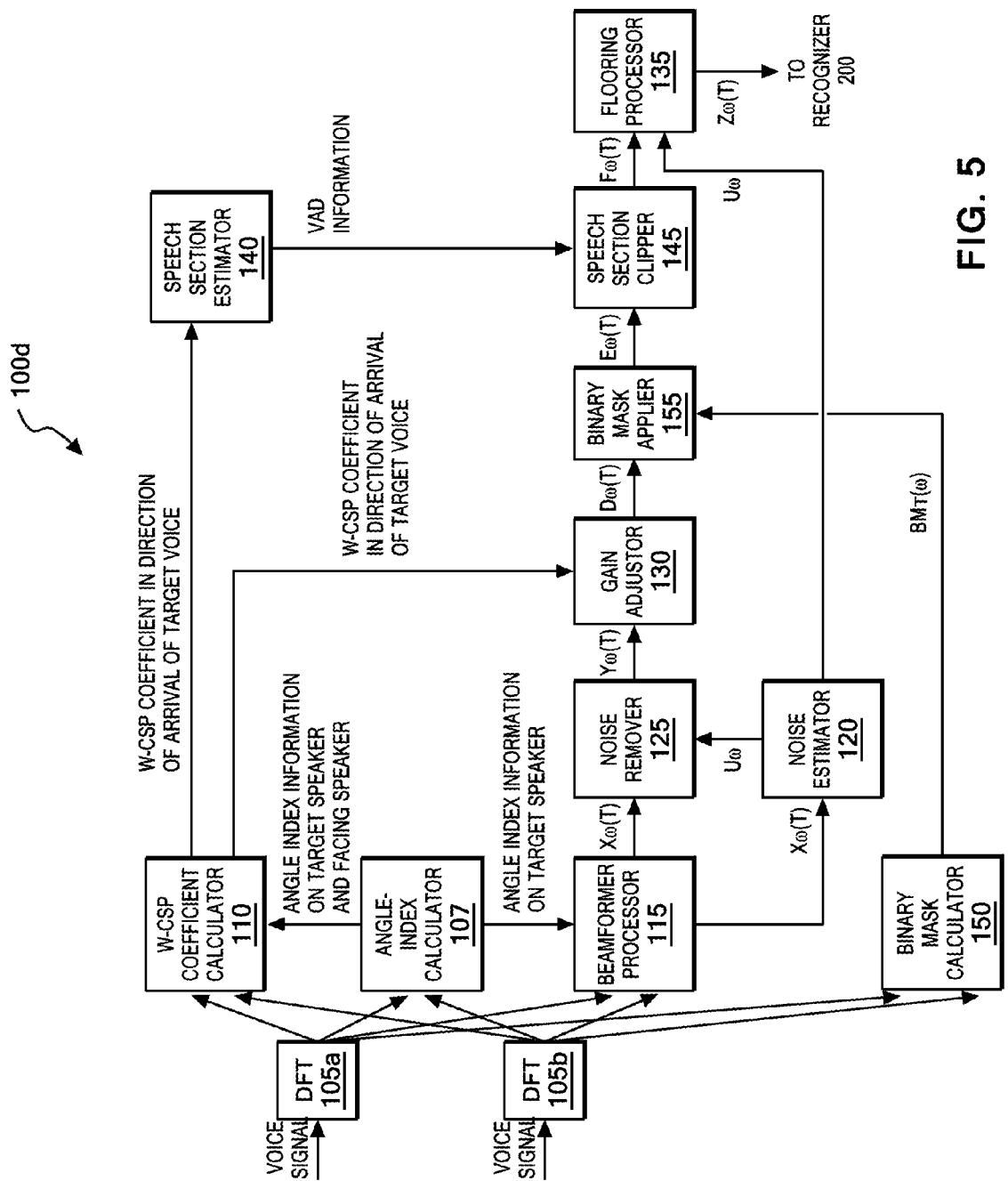
FIG. 5 is a functional illustration showing the configuration of a target voice extractor apparatus according to a fourth embodiment of the present invention.

FIG. 5 is an illustration of a fourth embodiment of the present invention. FIG. 5 shows a functional configuration of a target voice extractor 100d which has a substantially similar configuration to that of the target voice extractor 100c according to the third embodiment. This embodiment, however, additionally includes a binary-mask calculator 150 and a binary-mask applier 155. The details of binary-mask calculator 150 and the binary-mask applier 155 are described below to ease understanding.

Figure 9:
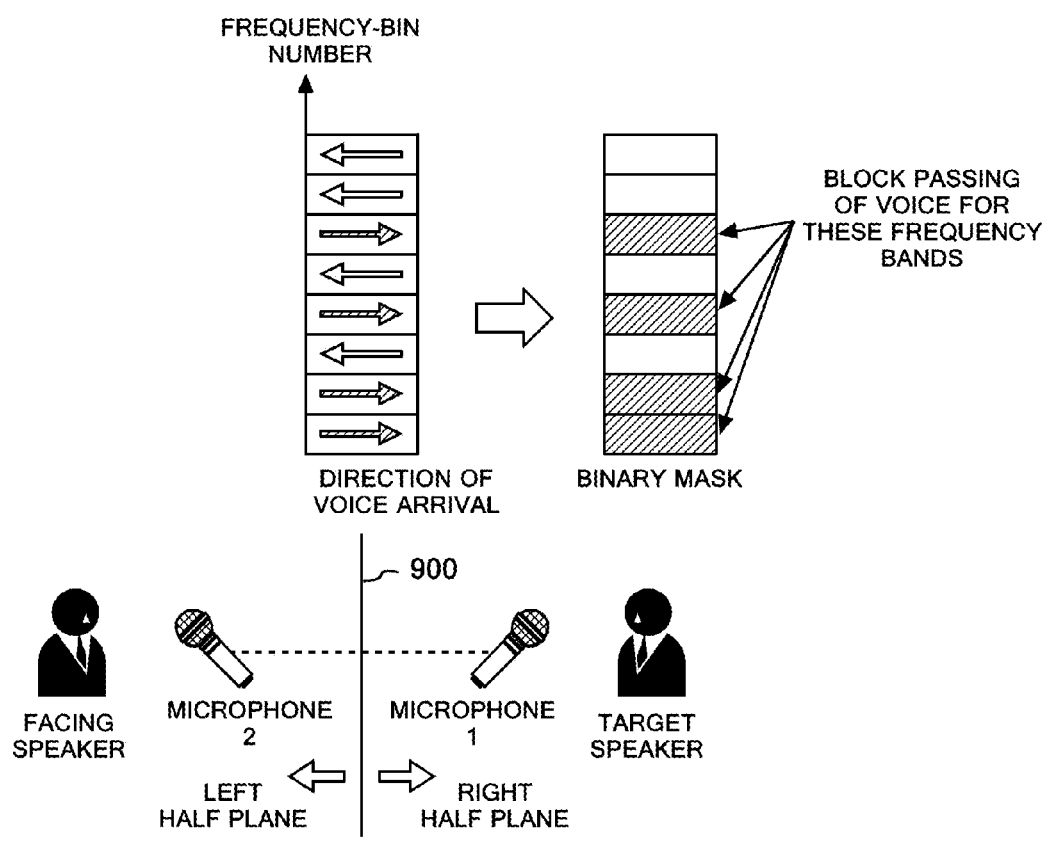
FIG. 9 is a schematic illustration showing diagram of a binary mask as an example.

The forth embodiment can also be understood better with further reference to FIG. 9. As depicted in FIG. 9, a plane on which the microphone 1 (a first voice input device) and the microphone 2 (a second voice input device) are disposed is divided by a line 900 perpendicular to a line connecting the microphone 1 and the microphone 2. Here, the target speaker is located on the right half plane, and the facing speaker is located on the left half plane. In other words, the target speaker and the facing speaker are located, toward their respective microphones, on the right and left half planes, respectively.

The target voice extractor 100d according to the fourth embodiment of the present invention uses previous knowledge that the target speaker and the facing speaker are located on the right and left half planes toward the two microphones, respectively, and thus calculates a certain binary mask which is used to remove a voice which is not a target voice. Specifically, as FIG. 9 shows, the target voice extractor 100*d* according to the fourth embodiment detects a direction of voice arrival for each frequency bin. Then, the target voice extractor 100*d* calculates a binary mask configured to pass a voice for a frequency bin having a direction of voice arrival directed toward the half plane on which the target speaker is located (in FIG. 9, the right half plane), and not to pass a voice for other frequency bins.

The direction of voice arrival for each frequency bin is obtained by the following formulae, as a phase $\theta T(\omega)$ of a moving average of a correlation $RT(\omega)$ of the signals $S1(t)$ and $S2(t)$ observed by the two microphones 1 and 2.

$$R_T(\omega) = S_{1,T}(\omega) \cdot S_{2,T}(\omega)^*$$ [Formulae 12]

$$\overline{R_T(\omega)} = \frac{1}{2M+1} \sum_{m=-M}^{M} R_{T+m}(\omega)$$

$$\theta_T(\omega) = \angle \overline{R_T(\omega)}$$

In the above formula, $S1,T(\omega)$ and $S2,T(\omega)$ are values obtained by performing a discrete Fourier transform on $S1(t)$ and $S2(t)$, respectively.

Experimental data shows that the phase $\theta T(\omega)$ obtained by Formula 12 cannot accurately represent direction of a voice arrival when the frequency exceeds a certain frequency. This is a non obvious deduction and a surprising deduction from expected results. A further study was then conducted to estimate the number of a frequency bin establishing an upper limit which will be presently discussed. In this case, the upper-limit frequency bin to which the binary mask is applicable needs to be calculated first. While binary masks which also uses directional voice arrivals are used in the prior art, however, since all the frequency bands are targeted, the binary mask has restrains and need to be reevaluated. One such unfortunate shortcoming is not being able to have a wide interval between the microphones and subsequent inability to obtain a high relevant sampling frequency. In addition, since the previous knowledge about the positions of the target speaker and the facing speaker is not used, clustering of the speaker positions is required.

Figure 10:
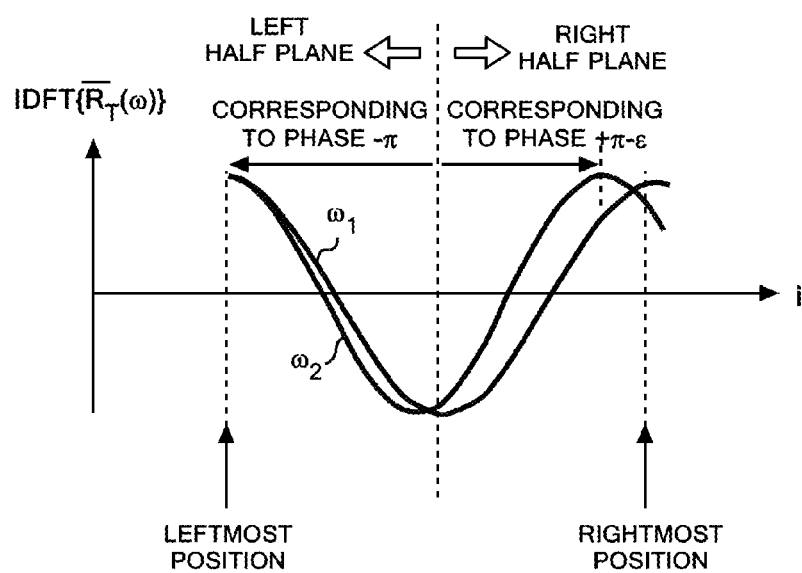
FIG. 10 is a graphical depiction illustrating the existence of an upper limit in a frequency to which the binary mask is applicable.

To address some of these issues, the following calculation is obtained by studying empirical data. FIG. 10 is an illustration of such calculation and results. FIG. 10 shows a discrete inverse Fourier transform of $RT(\omega)$ bar for two frequency-bin components. In this case, $\omega 2$ is a slightly higher frequency than $\omega 1$. In $\omega 1$, an expected phase difference $\theta T(\omega)$ when a sound source is at the leftmost position is $-\pi$. The phase difference $\theta T(\omega)$ reported by $\omega 2$ which is slightly higher than $\omega 1$ when a sound source is at the leftmost position is not the expected $-\pi$, but is a positive value slightly smaller than $+\pi$. For this reason, at the frequency $\omega 2$, it is wrongfully determined that a voice has arrived from the right half plane. Accordingly, $\omega 2$ exceeds an application limit of the binary mask using a direction of voice arrival, and thus it turns out that $\omega 1$ is the upper-limit frequency.

Subsequently, a frequency having $\theta T(\omega) = -\pi$ is obtained. The following formula is used to obtain an arrival time difference $\Delta t$ of sonic waves observed by the respective two microphones distanced from each other by d when a sound source is at the leftmost position.

$$\Delta t = -\frac{d}{c}$$ [Formula 13]

The following formula is then obtained for situations when fm is the frequency of sonic waves which allows the arrival time difference $\Delta t$ to be exactly $-\pi$.

$$2\pi \cdot f_m \cdot \Delta t = -\pi$$ [Formula 14]

The bin number of an upper-limit frequency to which the binary mask is applicable, namely, $\omega m$ is then obtained by converting the frequency fm into a bin number as shown in the following formula $$\omega_m = \frac{N}{F_s} \cdot f_m$$ [Formula 15]

$$= \frac{N \cdot c}{2 \cdot d \cdot F_s}$$

In the above formula, N denotes the width (number of sample points) of a discrete Fourier transform, and Fs denotes a sampling frequency.

The binary-mask calculator 150 of the target voice extractor 100*d* according to the fourth embodiment calculates a binary mask by using $\omega m$ which is the bin number of the upper-limit frequency obtained by the formula given above. More specifically, the binary-mask calculator 150 receives the signals $S1,T(\omega)$ and $S2,T(\omega)$ outputted from the respective discrete Fourier transformers 105*a* and 105*b*, and obtains the frequency-bin number of an upper-limit frequency in which a phase of a moving average of a correlation of $S1,T(\omega)$ and $S2,T(\omega)$ can correctly show a direction of voice arrival. Then, the binary-mask calculator 150 calculates a binary mask $BMT(\omega)$ configured to pass only a voice corresponding to frequency-bin numbers larger than the frequency-bin number of the upper-limit frequency and corresponding to frequency-bin numbers for which the above-mentioned phase shows, as the direction of voice arrival, the half plane on which the target speaker is located (the right half plane in this case).

The binary-mask calculator 150 obtains the binary mask $BMT(\omega)$ by using the following formula.

$$BM_T(\omega) = 1 \text{ if } \omega > \omega_m \text{ or } \theta_T(\omega) > 0$$ [Formula 16]

$$BM_T(\omega) = 0 \text{ otherwise}$$

$$\omega_m = \gamma \cdot \frac{N \cdot c}{2 \cdot d \cdot F_s}$$

In this formula (formula 16), $\gamma$ denotes a safety rate whose maximum value is 1.0. Note that $\gamma$ is 0.75 in the experiment to be described later. In addition, Formulae 16 are for calculating a binary mask used for a case where the target speaker is located on a half plane in which the phase takes a positive value. For a case where the target speaker is located on a half plane in which the phase takes a negative value, the condition for the phase difference is changed from $\theta T(\omega) > 0$ to $\theta T(\omega) < 0$.

The binary-mask applier 155 receives the power spectrum $D\omega(T)$ outputted from the gain adjustor 130, applies the binary mask acquired from the binary-mask calculator 150 to the power spectrum $D\omega(T)$, and outputs the result as a power spectrum $E\omega(T)$. Processing by the binary-mask applier 155 is expressed in the following formula.

$$E_\omega(T) = D_\omega(T) \text{ if } BM_T = 1$$

$$E_\omega(T) = \epsilon \cdot D_\omega(T) \text{ otherwise} \quad \text{[Formula 17]}$$

In this case, $\epsilon$ is an extremely small constant. An output of the binary-mask applier 155 is inputted to the speech section clipper 145. Note that FIG. 5 shows the gain adjustor 130, the speech section estimator 140, and the speech section clipper 145, but it is of course possible to make these components optional and to skip the processing by these components.

Figure 11:
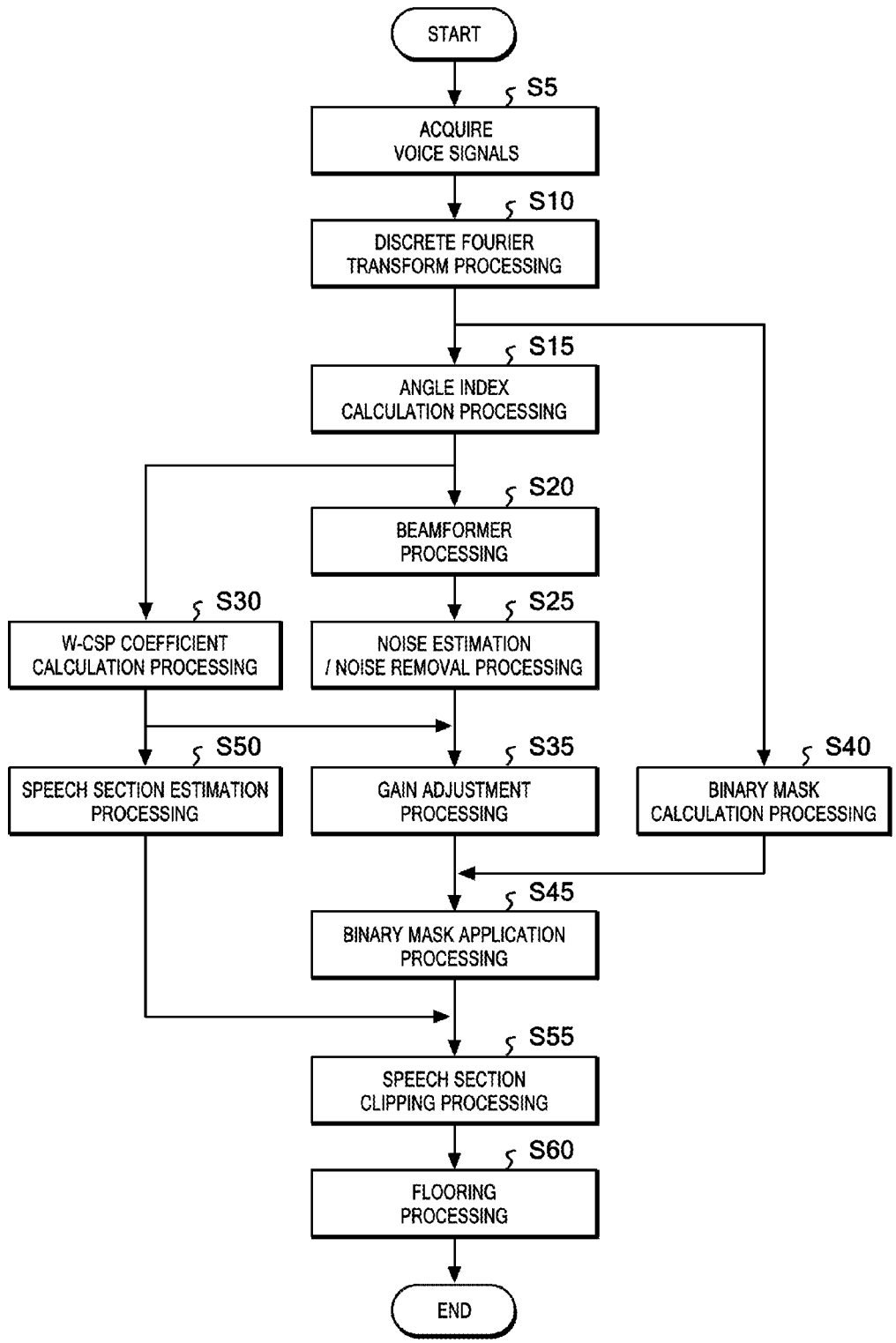
FIG. 11 is a flowchart illustration showing the flow of a target voice extraction processing according to one embodiment of the present invention.

FIG. 11 is an illustration of a flow of processing for extracting a target voice performed by the target voice extractor 100d according to the fourth embodiment of the present invention. It is to be noted that a flowchart for the target voice extractor 100 of each of the first to third embodiments of the present invention can be created by skipping some processing steps in FIG. 11. The processing starts in Step 5 where the target voice extractor 100d acquires speech signals $S1(t)$ and $S2(t)$ through the respective microphones 1 and 2 placed with a predetermined distance d therebetween. Next, the discrete Fourier transformers 105a and 105b of the target voice extractor 100d perform a discrete Fourier transform on the respective speech signals $S1(t)$ and $S2(t)$ obtained through the microphones 1 and 2, and thus calculate complex spectra $S1,T(\omega)$ and $S2,T(\omega)$, respectively (Step 10).

Subsequently, the directional-index calculator 107 of the target voice extractor 100d receives the complex spectra $S1,T(\omega)$ and $S2,T(\omega)$, and calculates the position (sound source) of a target speaker (a position i1) and the position (sound source) of a facing speaker (a position i2) by using a direction of arrival (DOA) calculation method of the CSP approach (Step 15). The beamformer processor 115 of the target voice extractor 100d receives the complex spectra $S1,T(\omega)$ and $S2,T(\omega)$, performs beamformer processing on $S1,T(\omega)$ and $S2,T(\omega)$ based on the i1 information, and outputs a power spectrum $X\omega(T)$ (Step 20).

The noise estimator 120 of the target voice extractor 100d, then estimates a power spectrum $U\omega$ of noise in a non-speech section of the target speaker, and the noise remover 125 of the target voice extractor 100d receives the power spectrum $X\omega(T)$, performs processing for removing stationary noise by using the power spectrum $U\omega$ of noise estimated by the noise estimator 120, and outputs a power spectrum $Y\omega(T)$ (Step 25). Meanwhile, concurrently with the processing in Steps 20 and 25, the weighted CSP coefficient calculator 110 of the target voice extractor 100d receives the complex spectra $S1,T(\omega)$ and $S2,T(\omega)$ and the i1 information, and calculates, based on $S1,T(\omega)$ and $S2,T(\omega)$, a moving average of a weighted CSP coefficient $\phi 2T(i)$ by using a weight coefficient $W(\omega)$ expressed by Formulae 5 and 6. Then, based on the i1 information, the weighted CSP coefficient calculator 110 calculates a moving average $\phi 2T(i1)$ bar of the weighted CSP coefficient (Step 30).

The processing follows from Step 25 to Step 35 where the gain adjustor 130 of the target voice extractor 100d multiplies the power spectrum $Y\omega(T)$ by the moving average $\phi 2T(i1)$ bar of the weighted CSP coefficient, thus performs control to exclusively output a voice of the target speaker, and outputs the result as a power spectrum $D\omega(T)$. Meanwhile, concurrently with the processing in Steps 15 to 30, the binary-mask calculator 150 of the target voice extractor 100d receives the complex spectra $S1,T(\omega)$ and $S2,T(\omega)$, and calculates a binary mask $BMT(\omega)$ configured to pass only a voice corresponding to frequency-bin numbers for which a phase $\theta T(\omega)$ of a moving average of a correlation of $S1,T(\omega)$ and $S2,T(\omega)$ indicates, as the direction of voice arrival, the half plane on which the target speaker is located and corresponding to frequency-bin numbers larger than a frequency-bin number of an upper-limit frequency to which the binary mask is applicable (Step 40).

The processing follows then from Step 35 to Step 45 where the binary-mask applier 155 of the target voice extractor 100d receives the power spectrum $D\omega(T)$, applies the binary mask $BMT(\omega)$ to the power spectrum $D\omega(T)$, and outputs the result as a power spectrum $E\omega(T)$. Meanwhile, concurrently with the processing in Steps 35 and 45, the speech section estimator 140 of the target voice extractor 100d estimates a speech section of a target voice by using the moving average $\phi 2T(i1)$ bar of the weighted CSP coefficient, and outputs speech section information $VAD(T)$ (Step 50). The processing proceeds from Step 45 to Step 55 where the speech section clipper 145 of the target voice extractor 100d clips a speech section out of the power spectrum $E\omega(T)$ based on the speech section information $VAD(T)$, and outputs the result as a power spectrum $F\omega(T)$.

Finally, the (flooring) processor 135 of the target voice extractor 100d receives the power spectrum $F\omega(T)$, performs flooring processing on the power spectrum $F\omega(T)$, and outputs the result as a power spectrum $Z\omega(T)$ (Step 60). With this, the processing ends.

Figure 12:
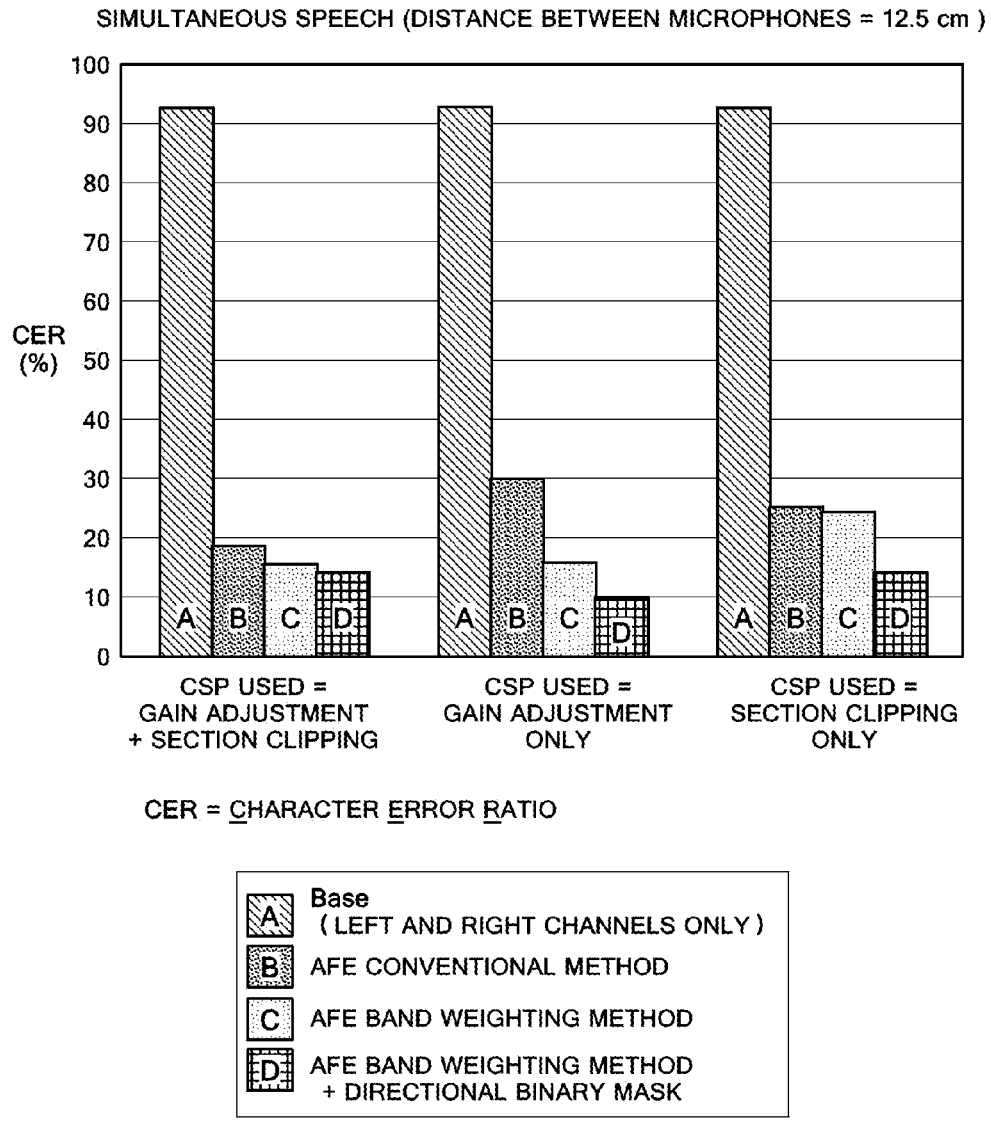
FIG. 12 is a graphical illustration showing results of an automatic speech recognition experiment conducted using a target voice extraction method according to one embodiment of the present invention.

FIG. 12 provides the next step and illustrates the effectiveness of application of one or more embodiments of the present invention by application of emperical data. FIG. 12 is based on an evaluation experiment conducted for automatic speech recognition using the target voice extraction method proposed by one embodiment of the present invention. The conditions of the experiment depicted by the results shown in FIG. 12 are listed below.

(Experiment Conditions)
Place: quiet, small meeting room;
Style: facing (including simultaneous speaking);
Microphones: two directional microphones placed in the middle of two speakers with a distance of 12.5 cm between the microphones;
Task: travel conversation task (dictation);
Sampling frequency: 22.5 kHz;
The number of speeches evaluated: a hundred speeches (the number of speeches of the target speaker)

It should be noted that, although an original recorded conversation had a style in which two speakers spoke alternately, a conversation having simultaneous speaking was created for this experiment by using waveform editing processing to artificially superpose a voice of one of the speakers on a voice of the other speaker.

As FIG. 12 illustrates, three types of automatic speech recognition results were obtained by this experiment for each of four target voice extractors having configurations A to D. Specifically, the types of automatic speech recognition results are: a case of performing the gain control processing and the speech section clipping processing ("CSP used=gain control+section clipping"), a case of performing the gain control processing ("CSP used=gain control only"), and a case of performing the speech section clipping processing ("CSP used=section clipping only"). Here, the configuration A is a conventional, base configuration which directly uses a signal recorded by one of left and right microphones (one closer to the target speaker). The configuration B is a configuration which uses a conventional, ASR front-end for speech enhancement (AFE) method which uses a CSP coefficient not weighted. The configuration C is the configuration of the target voice extractors according to the first to third embodiments using a CSP coefficient weighted as described above. The configuration D is the configuration of the target voice extractor according to the fourth embodiment using a CSP coefficient weighted as described above.

As can be appreciated by depiction of FIG. 12, the effect of employing the weighted CSP coefficient is noticeable in the case of using the weighted CSP coefficient for the gain control (see the configurations B and C in the case "CSP used=gain control only" in the middle part of FIG. 12). Moreover, the effect of adding the binary mask application is prominently shown in any of the modes using CSP. Note that, although not shown in FIG. 12, in a case of performing neither the gain control processing nor the speech section clipping processing but performing only the binary mask application processing, the character error ratio was 27.3%, which is below one third of the character error ratio of the base configuration A, which was 92.6%. As described, the target voice extraction method of the present invention can effectively decrease the error rate of automatic speech recognition.

Figure 13:
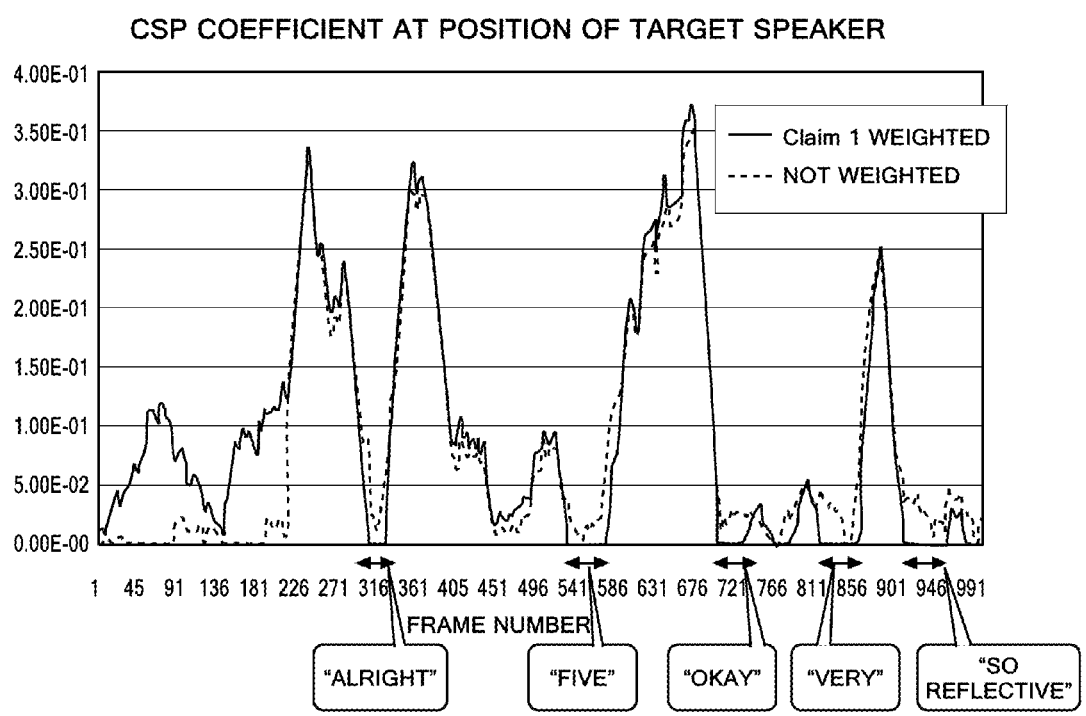
FIG. 13 is a graphical illustration of a temporal change in a W-CSP obtained by the experiment and derived by one embodiment of the present invention.

FIG. 13 is a graphical illustration showing histories of a weighted CSP coefficient and a CSP coefficient not weighted which were obtained with the same conditions as those in FIG. 12 at the position of the target speaker. The words shown in FIG. 12 were spoken by the facing speaker. The weighted CSP coefficient at the position of the target speaker descended close to zero when the facing speaker was speaking. This shows that speech of the facing speaker is efficiently prevented from being picked up.

Figure 14:
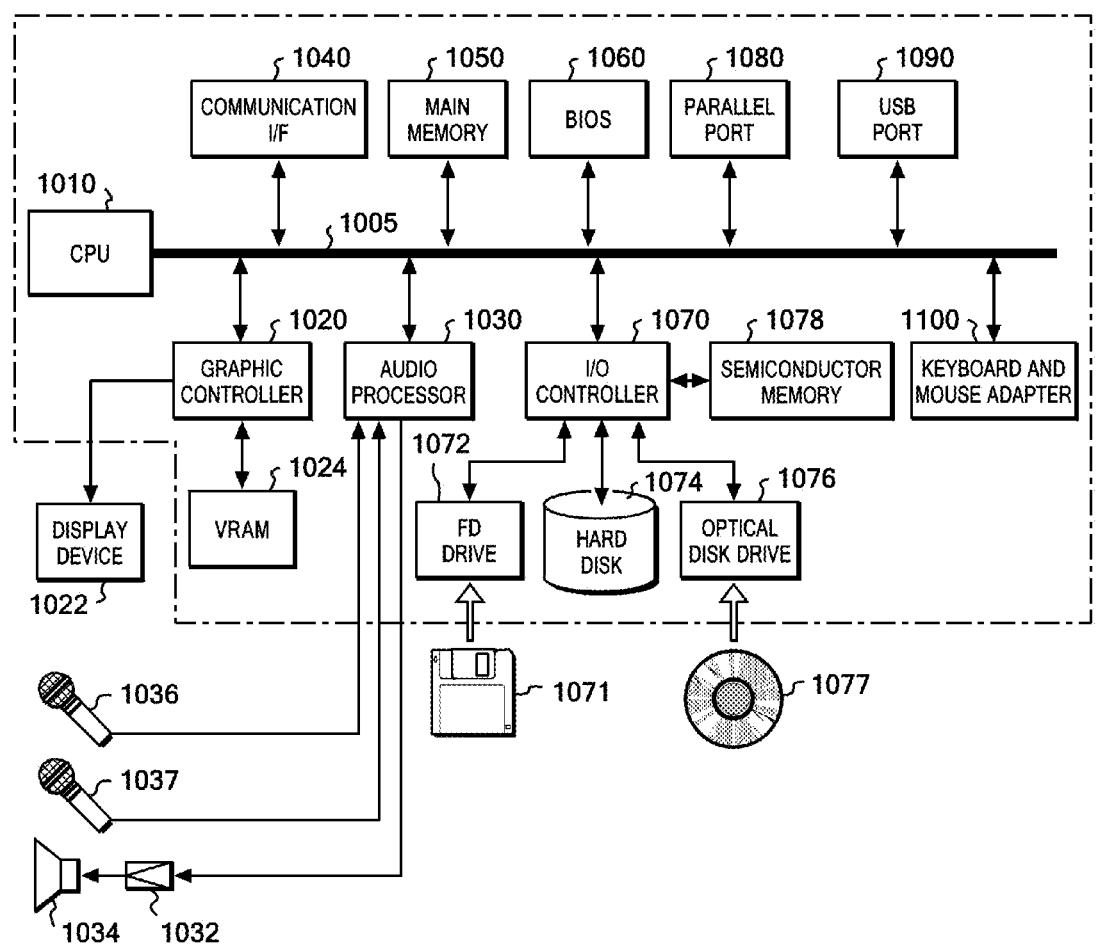
FIG. 14 is an illustration of a computer hardware configuration preferable for implementing a target voice extraction apparatus according to one embodiment of the present invention.

FIG. 14 is an illustration showing possible hardware configuration of a target voice extraction apparatus according to one embodiment of the present invention. In FIG. 14, the target voice extraction apparatus is shown as an information processing apparatus 1000, and its hardware configuration is illustrated as an example. A description is given below of the overall configuration, assuming that the target voice extraction apparatus is an information processing apparatus which is typically a computer. However, it goes without saying that any minimum configuration may be alternatively employed according to the use environment.

The information processing apparatus 1000, in one embodiment comprises a CPU 1010, a bus line 1005, a communication I/F 1040, a main memory 1050, a BIOS 1060, a parallel port 1080, a USB port 1090, a graphic controller 1020, a VRAM 1024, an audio processor 1030, an I/O controller 1070, and input means such as a keyboard and mouse adapter 1100. The I/O controller 1070 can be connected with storage means such as a flexible disk (FD) drive 1072, a hard disk 1074, an optical disk drive 1076, and a semiconductor memory 1078.

The audio processor 1030, as provided by one embodiment, is connected with a plurality of microphones—in this case depicted by numerals 1036 and 1037; as well as, an amplifier circuit 1032, and a loudspeaker 1034. The graphic controller 1020 is connected with a display device 1022.

The BIOS 1060 stores a boot program executed by the CPU 1010 at the startup of the information processing apparatus 1000, a program depending on the hardware of the information processing apparatus 1000, and the like. The FD drive 1072 reads a program or data from a flexible disk 1071, and provides the program or the data to the main memory 1050 or the hard disk 1074 via the I/O controller 1070. Although FIG. 14 shows an example where the hard disk 1074 is included in the information processing apparatus 1000, the hard disk may be externally connected or added to the information processing apparatus 1000 through an external device connection interface (not shown) connected to the bus line 1005 or to the I/O controller 1070.

As can be appreciated by those skilled in the art, a variety of drives and other such similar components can also be used in conjunction with the apparatus of the present invention. For example, examples of such drives usable as the optical disk drive 1076 can include DVD-ROM drives, CD-ROM drives, DVD-RAM drives, and CD-RAM drives. To use any of the above drives, an optical disk corresponding to the drive needs to be used. The optical disk drive 1076 is capable of reading a program or data from the optical disk 1077, and providing the program or the data to the main memory 1050 or the hard disk 1074 via the I/O controller 1070.

It may be helpful at this point to point, to revisit some of the features as discussed by one or more of the embodiments provided in the above mentioned discussions relating to the present invention. It was discussed how a CSP coefficient in a designated direction can take a relatively large value even when a speaker different from a target speaker located in the designated direction (i.e. a speaker located outside of the designated direction, is speaking). A CSP coefficient is obtained by performing an inverse discrete Fourier transform on a normalized correlation of two complex spectra signals, and can be regarded as superposition of multiple frequency-bin components. Accordingly, there are particular frequency-bin components likely to be affected by speech of the speaker different from the target speaker located in the designated direction. More specifically, a frequency band likely to be affected by speech of the speaker different from the target speaker is obtained using one or more of the embodiments of the present invention. Employing a weighted CSP coefficient using a weight coefficient that takes a small value for the frequency band is thus obtained and a target voice is extracted while preventing mixing of a voice different from the target voice, that is, a voice of the speaker different from the target speaker.

In one aspect of the present invention, a method for extracting a target voice from a plurality of voices having different directions of arrival respectively was introduced. The target voice extraction method including the steps of: performing a discrete Fourier transform on speech signals acquired through respective first and second voice input devices placed with a predetermined distance there between; obtaining a weighted CSP coefficient from the two discrete-Fourier-transformed speech signals by using a weight coefficient which, provided that the weighted CSP coefficient is superposition of components of a plurality of frequency bins, takes a smaller value for a frequency bin of a component affected by a voice different from the target voice than a value for frequency bins of other components; performing gain control on a power spectrum which is based on at least one of the two discrete-Fourier-transformed speech signals, by using the weighted CSP coefficient or a moving average thereof; and performing flooring processing on the power spectrum obtained by the gain control.

In this case, the frequency bin of the component affected by a voice different from the target voice, that is, the frequency bin of the component affected by a voice having direction of arrival different from that of the voice of the target speaker, may be a frequency bin of one component of the components of the plurality of frequency-bins which takes a positive value in both of a direction of voice arrival of a voice different from the target voice, that is, a voice of the non-target speaker, and a direction of voice arrival of the target voice. Preferably, the target voice extraction method further includes the steps of: estimating a speech section of the target voice by using the weighted CSP coefficient or the moving average thereof; and before the flooring processing, clipping a speech section out of the power spectrum obtained by the gain control, based on the speech section thus estimated.

The plurality of voices may be one or more target voice(s). This may be, for example, the voice of a first speaker and a different voice which is a voice of a second speaker, the first speaker and the second speaker being located on right and left half planes, respectively, into which a plane is divided by a line perpendicular to a line connecting the first voice input device and the second voice input device, and the target voice extraction method further includes the steps of: obtaining a frequency-bin number of an upper-limit frequency in which a phase of a moving average of a correlation of the two speech signals after the discrete Fourier transform can correctly indicate the direction of voice arrival, and calculating a binary mask configured to pass only a voice corresponding to a frequency-bin number larger than the frequency-bin number of the upper-limit frequency and corresponding to any of a plurality of frequency-bin numbers in which the phase indicates the right half plane as the direction of voice arrival; and before the flooring processing, applying the binary mask thus calculated to the power spectrum obtained by the gain control. Preferably, the target voice extraction method further includes the step of, before the gain control step, performing beam-former processing on the two discrete-Fourier-transformed speech signals in order to emphasize the target voice, and outputting a power spectrum.

In one embodiment, as discussed, the target voice extraction method may further includes the step of, after the beam-former processing and before the gain control, performing processing for removing stationary noise from the power spectrum by using an estimated power spectrum of noise. In order to solve the above problem, a second aspect of the present invention provides a method for extracting a target voice which is to be extracted from a plurality of voices having different directions of arrival respectively, the target voice extraction method including the steps of: performing a discrete Fourier transform on speech signals acquired through respective first and second voice input devices placed with a predetermined distance therebetween; obtaining a weighted CSP (cross-power spectrum phase) coefficient from the two discrete-Fourier-transformed speech signals by using a weight coefficient which, provided that the weighted CSP coefficient is superposition of components of a plurality of frequency bins, takes a smaller value for a frequency bin of a component affected by a voice different from the target voice than a value for frequency bins of other components; estimating a speech section of the target voice by using the weighted CSP coefficient or a moving average thereof; based on the speech section thus estimated, clipping a speech section out of a power spectrum which is based on at least one of the two discrete-Fourier-transformed speech signals; and performing flooring processing on a power spectrum of the speech section thus clipped out.

In this case, the frequency bin of the component affected by a voice different from the target voice, that is, the frequency bin of the component affected by a voice having direction of arrival different from that of the voice of the target speaker, is a frequency bin of one component of the components of the plurality of frequency-bins, the one component taking a positive value in both of a direction of voice arrival of a voice different from the target voice and a direction of voice arrival of the target voice. Preferably, the plurality of voices are a target voice which is a voice of a first speaker and a different voice which is a voice of a second speaker, the first speaker and the second speaker being located on right and left half planes, respectively, into which a plane is divided by a line perpendicular to a line connecting the first voice input device and the second voice input device, and the target voice extraction method further includes the steps of: obtaining a frequency-bin number of an upper-limit frequency in which a phase of from a moving average of a correlation of the two discrete-Fourier-transformed speech signals can correctly indicate the direction of voice arrival, and calculating a binary mask configured to pass only a voice corresponding to a frequency-bin number larger than the frequency-bin number of the upper-limit frequency and corresponding to any of a plurality of frequency-bin numbers in which the phase indicates the right half plane as the direction of voice arrival; and before the flooring processing, applying the binary mask thus calculated to the power spectrum obtained by the gain control.

A computer program product can also be provided to the information processing apparatus 1000 is stored in a storage medium such as the flexible disk 1071, the optical disk 1077, or a memory card, and is provided to the information processing apparatus 1000 by a user. The computer program is executed after installed onto the information processing apparatus 1000 by being read from the storage medium via the I/O controller 1070, or by being downloaded via the communication I/F 1040. A description of operations which the computer program drives the information processing apparatus 1000 to perform is omitted here because they are the same as the operations of the target voice extractor 100 which have already been described.

The computer program product may be stored in an external storage medium. Media usable as the external storage medium include a magneto-optical storage medium, such as an MD, and a tape medium, in addition to the flexible disk 1071, the optical disk 1077, and a memory card. Alternatively, the computer program may be provided to the information processing apparatus 1000 via a communication line by using, as a storage medium, a storage device such as a hard disk or an optical disk library provided on a server system connected to a dedicated communication line or the Internet.

The above description has been given mainly on the information processing apparatus 1000; however, a program having the above-described functions of the information processing apparatus may be installed on a computer to operate the computer as the information processing apparatus as can be appreciated by those skilled in the art in a number of alternate embodiments. Thereby, the computer can implement the same functions as those of information processing apparatus described above.

The information processing apparatus can be implemented by hardware, software, or a combination of both. Implementation with a computer system having a predetermined program is a typical example of the implementation by a combination of hardware and software. In such a case, the predetermined program is loaded and executed on the computer system, thereby causing the computer system to perform processing according to the present invention. The program consists of an instruction set which can be expressed in any selected language, codes, or expressions. Such an instruction set enables the system to directly execute a particular function, or to execute the particular function after (1) being converted into any other language, codes, or expressions, and/or (2) being copied to another medium. The scope of the present invention of course includes not only such a program itself, but also a program product including a medium recording the program. The program for implementing the functions of the present invention can be stored in any selected computer readable medium such as a flexible disk, an MO, a CD-ROM, a DVD, a hard disk device, a ROM, an MRAM, and a RAM. The program to be stored in the computer readable medium can be acquired by downloading the program from another computer system connected through a communication line, or by making a copy of the program in another medium. Moreover, the program can be compressed to be stored in a single storage medium, or can be divided into multiple pieces to be stored in multiple storage media.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for separating a target voice from a plurality of other voices having different directions of arrival, comprising:
   disposing a first and a second voice input device at a predetermined distance from one another and upon receipt of voice signals at said devices calculating discrete Fourier transforms for said signals;
   calculating a weighted CSP (cross-power spectrum phase) coefficient from said two transformed signals, each assigned its own weight coefficients, each value of said weight coefficients for frequency components of the Weighted CSP that are affected by other speeches other than the target speech being smaller than each value of the weight coefficients for other frequency components of the Weighted CSP;
   performing gain control on the power spectrum based on the weighted CSP coefficient or moving average thereof;
   estimating a speech section of said target voice by using weighted CSP coefficient or moving average thereof;
   clipping a speech section out of the power spectrum obtained by the gain control, based on the estimated speech section; and
   separating a target voice when received by said devices from other voice signals in a spectrum by using said calculated weighted CSP coefficient.

2. The method of claim 1, further comprising the step of obtaining a frequency-bin number for an upper-limit frequency in which a phase of a moving average of a correlation of the two speech signals after the discrete Fourier transform indicates the direction of voice arrival.

3. The method of claim 2, further comprising the steps of:
   calculating a binary mask configured to pass only a voice corresponding to a frequency-bin number larger than the frequency-bin number of the upper-limit frequency, corresponding to any of a plurality of frequency-bin numbers in which the phase indicates a half plane containing the source of the target voice as the direction of voice arrival; and
   applying the binary mask to the power spectrum obtained by the gain control.

4. The method of claim 1, further comprising the step of, before the gain control step, performing a beam-former processing step on said two discrete-Fourier-transformed speech signals in order to emphasize the target voice, and outputting a power spectrum.

5. The method of claim 4, further comprising the step of, after the beam-former processing and before the gain control step, performing a processing step of removing stationary noise from the power spectrum by using an estimated power spectrum of noise.

6. The method of claim 1, wherein said weighted CSP (cross-power spectrum phase) coefficient is calculated from said two discrete-Fourier-transformed speech signals by using a weight coefficient which is comprised of a superpositioning of components of a plurality of frequency bins.

7. The method of claim 6, further comprising the step of obtaining a frequency-bin number for an upper-limit frequency and calculating a binary mask configuration to pass only one voice corresponding to a frequency-bin number larger than the frequency-bin number of the upper-limit frequency.

8. The method of claim 1, further comprising performing flooring processing on a power spectrum of the speech section thus clipped out.

9. A computer program product for separating a target voice from a plurality of other voices having different directions of arrival, the computer program product comprising:
   a computer readable tangible non-transitory storage device having computer readable program code for causing a computer to effect the method steps of:
   calculating discrete Fourier transforms for voice signals received from a first and a second voice input device at a predetermined distance from one another;
   calculating a weighted CSP coefficient from each of said two discrete Fourier-transformed speech signals, each value of said weight coefficients for frequency components of the weighted CSP that are affected by other speeches other than the target speech being smaller than each value of the weight coefficients for other frequency components of the weighted CSP; and
   performing gain control on the power spectrum based on the weighted CSP coefficient or moving average thereof;
   estimating a speech section of said target voice by using weighted CSP coefficient or moving average thereof;
   clipping a speech section out of the power spectrum obtained by the gain control, based on the estimated speech section; and
   separating a target voice when received by said devices from other voice signals in a spectrum by using said calculated weighted CSP coefficient.

10. The computer program product of claim 9, further comprising the step of obtaining a frequency-bin number for an upper-limit frequency in which a phase of a moving average of a correlation of the two voice signals after the discrete Fourier transform indicates the direction of voice arrival.

11. The computer program product of claim 9, further comprising the steps of:
    calculating a binary mask configured to pass only a voice corresponding to a frequency-bin number larger than the frequency-bin number of the upper-limit frequency, corresponding to any of a plurality of frequency-bin numbers in which the phase indicates a half plane containing the source of the target voice as the direction of voice arrival; and
    applying the binary mask to the power spectrum obtained by the gain control.

12. The computer program product of claim 9, further comprising the step of, before the gain control step, performing a beam-former processing step on said two discrete-Fourier-transformed speech signals in order to emphasize the target voice, and outputting a power spectrum.

13. The computer program product of claim 12, further comprising the step of, after the beam-former processing and before the gain control step, performing a processing step of removing stationary noise from the power spectrum by using an estimated power spectrum of noise.

14. The computer program product of claim 9, wherein said weighted CSP (cross-power spectrum phase) coefficient is calculated from said two discrete-Fourier-transformed speech signals by using a weight coefficient which is comprised of a superpositioning of components of a plurality of frequency bins.

15. The computer program product of claim 14, further comprising the step of obtaining a frequency-bin number for an upper-limit frequency and calculating a binary mask configuration to pass only one voice corresponding to a frequency-bin number larger than the frequency-bin number of the upper-limit frequency.

16. The computer program product of claim 9, further comprising performing flooring processing on a power spectrum of the speech section thus clipped out.

17. An apparatus for extracting a target voice from other voices received from different directions comprising:

Fourier transform means that performs a discrete Fourier transform on speech signals acquired through respective first and second voice input devices placed with a predetermined distance therebetween;

W-CSP coefficient calculation means for calculating a weighted CSP (cross-power spectrum phase) coefficient from the two discrete-Fourier-transformed speech signals, each transformed signal having its own weight coefficient, said calculation means using a weight coefficient provided by superpositioning of components from a plurality of frequency bins such that a smaller value is apportioned to a frequency bin of a component affected by any v received components such that said target voice can be separated from other voices;

gain control means for performing gain control operation on a power spectrum, wherein said power spectrum and gain operations are dependent upon at least one of said two discrete-Fourier-transformed speech signals provided by using the weighted CSP coefficient or a moving average thereof; and flooring processing means for performing flooring processing on the power spectrum obtained by said gain control.

18. The apparatus according to claim 17, further comprising a speech section estimation means for estimating a speech section of said target voice by using the weighted CSP coefficient or a moving average thereof.

19. The apparatus according to claim 18, wherein said speech section estimation means estimates said section by clipping a speech section out of a power spectrum which is based on at least one of the two discrete-Fourier-transformed speech signals;

the apparatus further comprising flooring processing means for performing flooring processing on a power spectrum of the speech section thus clipped out.

* * * * *